(12) United States Patent
Jablecki et al.

(10) Patent No.: US 11,738,717 B2
(45) Date of Patent: Aug. 29, 2023

(54) WIPER SYSTEM FOR CLEANING A VEHICLE WINDOW WITH HIGH CURVATURE

(71) Applicant: Valeo Systemes d'Essuyage, La Verriere (FR)

(72) Inventors: Sebastian Jablecki, La Verriere (FR); Przemyslaw Szymanek, La Verriere (FR); Tomasz Ostrogorski, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 17/466,924

(22) Filed: Sep. 3, 2021

(65) Prior Publication Data
US 2022/0105901 A1    Apr. 7, 2022

(30) Foreign Application Priority Data
Oct. 5, 2020   (EP) .................................... 20200153

(51) Int. Cl.
*B60S 1/34* (2006.01)

(52) U.S. Cl.
CPC ............. *B60S 1/3409* (2013.01); *B60S 1/345* (2013.01); *B60S 1/3406* (2013.01);
(Continued)

(58) Field of Classification Search
CPC .... B60S 1/3406; B60S 1/3404; B60S 1/3409; B60S 1/3418; B60S 1/3436; B60S 1/3431;
(Continued)

(56) References Cited

U.S. PATENT DOCUMENTS 5,651,159 A *  7/1997  Hoshino ............... B60S 1/3406
                                                      15/250.32
8,584,303 B2 * 11/2013 Wolfgarten ........... B60S 1/3409
                                                      15/250.31

FOREIGN PATENT DOCUMENTS

FR         2878802 A1    6/2006
FR         2897323 A1    8/2007
(Continued)

OTHER PUBLICATIONS

Machine translation of description portion of WO 2009/056428, published May 2009 (Year: 2009).*
(Continued)

*Primary Examiner* — Gary K. Graham
(74) *Attorney, Agent, or Firm* — Valeo Systemes d'Essuyage

(57) ABSTRACT

The present invention relates to a pantographic-type wiper system for cleaning a vehicle window that includes a drive attachment, a first arm, a second arm and a head configured to hold a wiper blade, where the first arm extends between the drive attachment and the head, where the second arm extends between a holding device attached to the drive attachment and the head, also characterized in that the wiper system includes a connecting body that links the first arm to the drive attachment and where the wiper system includes a pivot link (P) between the connecting body and the drive attachment and includes a rotational link (D) between the connecting body and the first arm; the wiper system also including at least a rotational device that allows motion around a first axis (A) that corresponds to a main elongation axis of the second arm between the head and the second arm or between the holding device and the second arm.

14 Claims, 11 Drawing Sheets

(52) U.S. Cl.
    CPC ........... *B60S 1/3418* (2013.01); *B60S 1/3425* (2013.01); *B60S 1/3436* (2013.01); *B60S 1/3472* (2013.01); *B60S 1/3486* (2013.01)

(58) Field of Classification Search
    CPC ...... B60S 1/345; B60S 1/3486; B60S 1/3425; B60S 1/3472
    USPC .......................................... 15/250.21, 250.23
    See application file for complete search history.

(56) References Cited

FOREIGN PATENT DOCUMENTS

| | | | |
|---|---|---|---|
| FR | 2922841 | A1 | 5/2009 |
| WO | 2009/056428 | * | 5/2009 |

OTHER PUBLICATIONS

The European Patent Office, Extended European Search Report for corresponding European Application No. EP20200153.3-1015, dated Mar. 18, 2021.

* cited by examiner

WIPER SYSTEM FOR CLEANING A VEHICLE WINDOW WITH HIGH CURVATURE

CROSS-REFERENCE TO RELATED APPLICATIONS

This application is filed under 35 U.S.C. § 111(a), a U.S. National Application claiming the benefit of European Application No. 20200153.3 filed Oct. 5, 2020, the disclosure of which is herein incorporated by reference in its entirety.

TECHNICAL FIELD

The invention relates to a wiper system for cleaning a vehicle window, and more particularly to an adapted wiper system for a complex vehicle window, for instance panoramic vehicle windows.

BACKGROUND ART

Generally, a vehicle comprises a windshield in front of a driver, who can see, through the windshield, the road and the front of the vehicle. The windshield must be transparent and clean to allow the driver to observe the front of the vehicle. Because of its position, the windshield is subject to weather conditions, water and dirt that can come onto the window and obstruct the driver's vision. For that, the vehicle comprises a wiper system to remove this water and dirt.

The wiper system traditionally consists of an arm extending between a first end attached to the vehicle and a second end to which a wiper blade is attached. The arm is connected to a shaft of a motor of the vehicle via its first end, the arm moving back and forth around an axis of the motor to wipe the windshield.

Some vehicles can be equipped with a panoramic window, being a window comprising extremity portions, which extend on the sides of the vehicle. These extremity portions may be difficult to wipe effectively for known wiper systems. Indeed, the wiper system can generally wipe a planar surface but it is more complicated to wipe a window extending in two intersecting planes.

Such windshields are common in trucks, buses, and other heavy vehicles where good visibility and fuel economy are equally important design considerations. This kind of windshield is also becoming present in light vehicles. Irrespective the type of vehicle that can have this kind of windshield, the wiper system of known solution can be of the pantographic-type, having two arms that move in a coordinated manner. This pantographic wiper system is adapted to hold a long and/or heavy wiper blade.

SUMMARY

In this context, the present invention is directed towards a wiper system of the pantographic-type for cleaning a vehicle window, comprising a drive attachment, a first arm, a second arm and a head configured to hold a wiper blade, the first arm extending between the drive attachment and the head, the second arm extending between a holding device, attached to the drive attachment, and the head, characterized in that the wiper system comprises a connecting body that is linking the first arm to the drive attachment, the wiper system comprising a pivot link between the connecting body and the drive attachment and a rotational link between the connecting body and the first arm, the wiper system comprising at least a rotational device allowing a motion around a first axis corresponding to a main axis of elongation of the second arm between the head and the second arm or between the holding device and the second arm.

The connective body links the first arm to the drive attachment and comprises the pivot link between the connective body and the drive attachment and the rotational link between the connective body and the first arm.

The connecting body is at least in contact with the first arm and/or the drive attachment. This connecting body may be attached to the first arm and/or the drive attachment. The connecting body guides the wiper blade against two portions of the window of the vehicle extending in planes intersecting each other. The wiper blade can wipe the first portion then the second portion, and then wipe again on the first portion.

The first and the second arms extend along a general axis, the second arm being able to rotate around a first axis that extend along the length of the second arm. The rotational device allows the motion of the second arm around at least this first axis, and can be located between the holding device and the second arm, and/or between the second arm and the head, and/or at any place of the second arm separating the latter in two parts, which can be have equal or unequal length.

According to an optional characteristic of the invention, the holding device and the drive attachment are made in a single part. It is understood that the holding device and the drive attachment are inseparable without causing the destruction of one or the other. In others words, the holding device and the drive attachment form a monobloc element.

According to an example of the invention, the rotational device is located at least at one end of the second arm. This end is a longitudinal end of the second arm, the rotational device being located at a first end or at a second end in order to allow rotation of the second arm when the wiper blade start to wipe the second portion of the window.

In other words, the rotational device can be in contact with the holding device and with one of the ends of the second arm or with the head and with the other end of the second arm.

According to an option of the invention, the wiper system comprises an articulation linking the second arm to the holding device. The articulation allows a rotational motion of the second arm while maintaining the second arm connected to the holding device.

According to another optional characteristic of the invention, the rotational device and the articulation are located at one end of the second arm and are formed by a ball joint. In this manner, the ball joint constitutes both the rotational device and the articulation.

In this embodiment, the ball joint allows the motion of the second arm at least around the first axis, and potentially around another axis perpendicular to the first axis, while ensuring the mechanical link between the second arm and the holding device.

According to another optional characteristic of the invention, the articulation which is linking the second arm to the holding device is a first articulation, the wiper system comprising a second articulation linking the second arm to the head. The wiper system can comprise two articulations each located at one longitudinal end of the second arm, one of this first or second articulation being equipped with the rotational device allowing motion around the first axis, an example of which being a ball joint.

In a first example, the rotational device is included or formed by the first articulation.

According to another example, the rotational device and the second articulation are located at one end of the second arm and are formed by a ball joint.

According to another optional characteristic of the invention, the ball joint, which is located at one end of the second arm, allows a rotational motion of the second arm around a second axis that is perpendicular to the first axis. In that case, it can be the ball joint that is located at the first longitudinal end of the second arm or the ball joint that is located at the second longitudinal end of the second arm.

According to another optional characteristic of the invention, the first articulation allows the motion of the second arm around the first axis and around the second axis, the second articulation allowing a motion of the second arm around a third axis which is perpendicular to the first axis and to the second axis.

It is understood that the second arm can move around the first and the second axis with the help of the ball joint formed at the first articulation, and around the third axis with the help of the ball joint formed at the second articulation.

In an alternative, the second arm can move around the second axis with the help of the ball joint formed at the first articulation, and around the first axis and around the third axis with the help of the ball joint formed at the second articulation According to another optional characteristic of the invention, the rotational link has an axis that extends along a first direction, the pivot link having an axis that extends along a second direction, said first direction and said second direction being secant, wherein the wiper system comprises a mechanical link between the drive attachment and the first arm enforcing a rotation of the pivot link.

The pivot link is parallel to or co-axial with the first direction and the rotational link is parallel to or co-axial with the second direction. The first direction and the second direction are intersecting each other.

According to another optional characteristic of the invention, the mechanical link comprises a lever piece and at least a ball articulation disposed at one end of the lever piece.

According to another optional characteristic of the invention, the lever piece comprises at least a housing for the ball articulation.

According to another optional characteristic of the invention, the drive attachment and/or the first arm comprises at least an outgrowth on which the ball articulation is arranged.

According to another optional characteristic of the invention, the ball articulation of the outgrowth is housed in the housing of the lever piece.

According to another optional characteristic of the invention, the mechanical link comprises a lever body with a gear meshing with a toothed sector provided on the drive attachment, the toothed sector and the gear presenting a curve profile.

According to another optional characteristic of the invention, the wiper system comprises a spring element attached to the connecting body and to the first arm.

According to another optional characteristic of the invention, the first arm and the connecting body is configured to rotate around the axis of the pivot link when the spring element applies a traction between the connecting body and the arm.

The traction of the spring element holds the wiper blade on the window of the vehicle, in particular against the first portion of the window and against the second portion of the window, that is to say the curved portion.

The invention relates to a method for wiping a panoramic window using a wiper system according to one of the preceding claims that includes a wiper blade to wipe the panoramic window that comprises a first portion extending in a first plane and at least a second portion that is curved relative to first plane, method in which the wiper blade is in a first position to wipe the first portion of the panoramic window and in a second position to wipe the second portion of the panoramic window, said pivot link being rotating when gradually changing from the first position to the second position, the rotational device allowing a motion around the first axis of the second arm between the head and the second arm or between the holding device and the second arm.

The second portion consists at least of a curved surface connected to the first portion of the panoramic window. Said second portion can also include a planar surface after the curved surface, said planar surface extending in the second plan. The second portion of the panoramic window extends at least on one of the lateral sides of the vehicle.

The invention concerns also a vehicle comprising a panoramic window and at least a wiper system according to one of above characteristics, configured to wipe the panoramic window.

BRIEF DESCRIPTION OF THE DRAWINGS

Other characteristics, details and advantages of the invention will become clearer on reading the following description, on the one hand, and several examples of realization given as an indication and without limitation with reference to the schematic appended drawings, on the other hand, on which.

DETAILED DESCRIPTION

The characteristics, variants and different modes of realization of the invention may be associated with each other in various combinations, in so far as they are not incompatible or exclusive with each other. In particular, variants of the invention comprising only a selection of features separately described from the other features may be imagined, if this selection of features is enough to confer a technical advantage and/or to differentiate the invention from prior art.

In the following description, the designations "longitudinal", "traversal" and "vertical" refer to the orientation of a wiper system according to the invention. A longitudinal direction corresponds to a main direction of extension of a first arm or a second arm of the wiper system, this longitudinal direction being parallel to a longitudinal axis L of a marker L, V, T shown in the figures. A transversal direction corresponds to a direction of main extension of an outgrowth of the arm of the wiper system, for example, this transversal direction being parallel to a transverse axis T of a marker L, V, T, and perpendicular to the longitudinal axis L. Finally, a vertical direction corresponds to a vertical axis V of a marker L, V, T, the vertical axis V being perpendicular to the longitudinal axis L and the transversal axis T.

Figure 1:
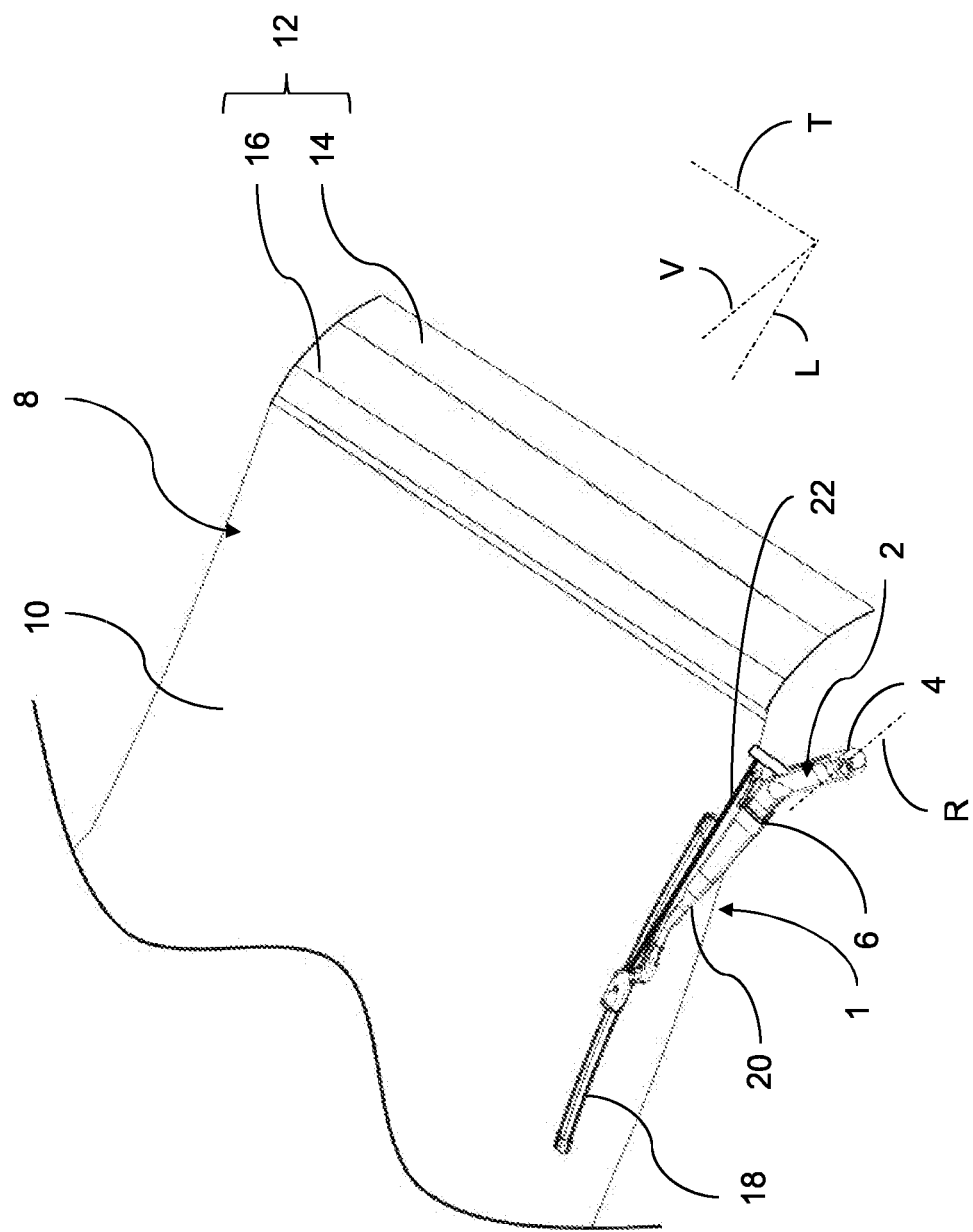
FIG. 1 is a perspective representation of a wiper system according to the invention located on a panoramic window.

As illustrated in FIG. 1, a wiper system 1 comprises at least a drive attachment 2 extending between a first end 4 and a second end 6. At its first end 4, the drive attachment 2 may be attached to a vehicle, and more particularly to a shaft of an electrical motor that sets the wiper system 1 in motion around a rotation axis R of the wiper system 1. The wiper system 1 has the function of wiping a window of the vehicle, for instance in front windshield 8 of the vehicle. According to the invention, the windshield 8 is a panoramic window comprising at least two portions: a first portion 10 comprising at least a planar surface 14 extending in a first plane; and a second portion 12 extending in a second plane intersecting the first plan. The second portion 12 consists of a planar surface 14 extending in the second plane and a curved surface 16 linking the planar surface 14 of the second portion 12 to the planar surface 14 of the first portion 10.

However, it will be understood that the windshield illustrated here is purely illustrative; a windshield where a second portion 12 comprises only a curved surface, like the curved surface 16 of the second portion 12, or alternatively a windscreen which is entirely flat, are equally included in the scope of the invention.

The wiper system 1 rotates around the rotation axis R at the first end 4 of the drive attachment 2. Once the motor is on, the wiper system 1 realizes a back and forth movement against the windshield 8 of the vehicle to wipe it, including a passage on the first portion 10 and on the second portion 12 of the windshield 8.

Moreover, the wiper system 1 comprises a wiper blade 18 comprising at least a scraper blade configured to be in contact with the windshield 8 of the vehicle and to wipe it. The scraper blade has a triangular transversal section of which only one vertex is in contact with the windshield 8, which its name is an attack angle. The scraper blade moves around a hinge, a line passing through the hinge and the attack angle of the scraper blade forms a specific angle with the windshield 8. To provide a good wiping action, the specific angle must be adapted to the angle of the windshield 8, the type of vehicle, speed of the vehicle and type of the scraper blade, over the full range of motion of the blade. This angle must be respected on the first portion 10 of the windshield 8 as well as on its second portion 12, the invention achieving this result by simple and reliable means.

Figure 2:
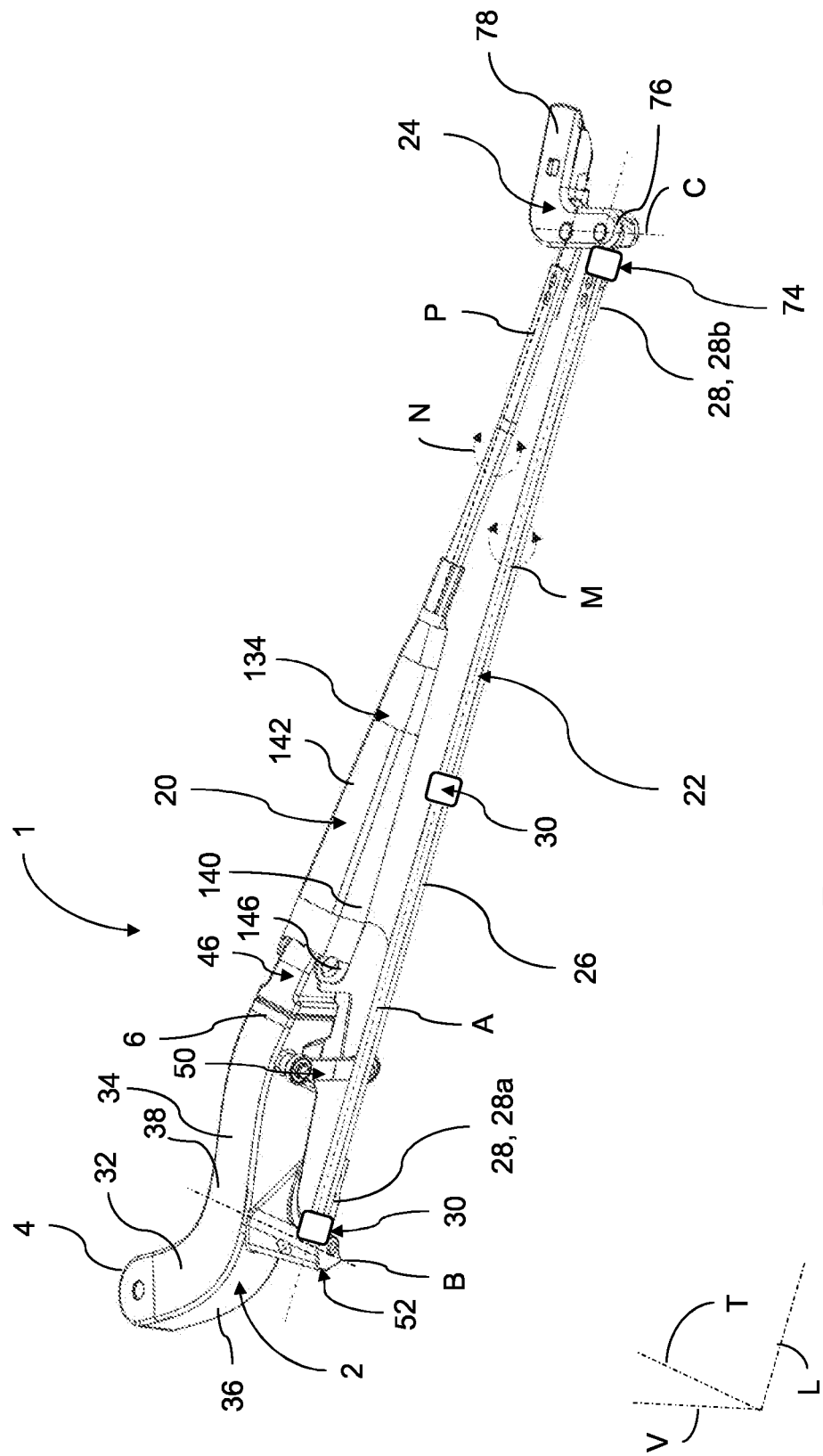
FIG. 2 is a perspective representation of the wiper system according to FIG. 1.

As illustrated in FIG. 2, the wiper system 1 is a pantographic-type and comprises, in addition to the drive attachment 2, a first arm 20, a second arm 22 and a head 24 to which the two arms 20, 22 are connected, each arm 20, 22 extending in particular along the longitudinal axis L. The head 24 is configured to hold the wiper blade 18, said head being linked to each arm 20, 22 by an articulation. The head is L-shaped, a part of this L-shape being a receptacle able to receive an adaptor of the wiper blade, while the other part of this L-shape is supporting the articulations dedicated to each arm.

At least the second arm 22 consists of a main rod 26 with two extensions 28 located at each longitudinal end of the main rod 26, as seen in FIG. 2. One of these extensions 28 is linked to the drive attachment 2 and the other extension 28 is attached to the head 24. The extension 28 which is in touch with the drive attachment 2 is called "first extension 28a" and the extension 28 which is in touch with the head 24 is called "second extension 28b". However, the second arm 22 can consist of a single rod without going beyond of the scope of the invention.

According to the invention, the wiper system 1 comprises at least a rotational device 30 schematically illustrated and allowing a motion M around a first axis A, corresponding to a main axis of elongation of the second arm 22, between the head 24 and the second arm 22 or between the drive attachment 2 and the second arm 22. More particularly, and as shown on FIG. 2, the rotational device 30 can be located at one of the longitudinal ends of the second arm 22 or in a central portion of this second arm 22.

In a first embodiment, the rotational device 30 is located at the longitudinal end of the second arm 22 which is linked to the drive attachment 2. When it is necessary, the motion M around the first axis A is realized between the drive attachment 2 and the second arm 22.

In a second embodiment, the rotational device 30 is located at the longitudinal end of the second arm 22 that is linked to the head 24. When it is necessary, the motion M around the first axis A is operated between the head 24 and the second arm 22.

In a third embodiment, the rotational device 30 is in the central portion of the second arm 22 and dividing the second arm 22 in two parts. When it is necessary, the motion M around the first axis A is realized between each of these parts of the second arm 22.

Figure 3:
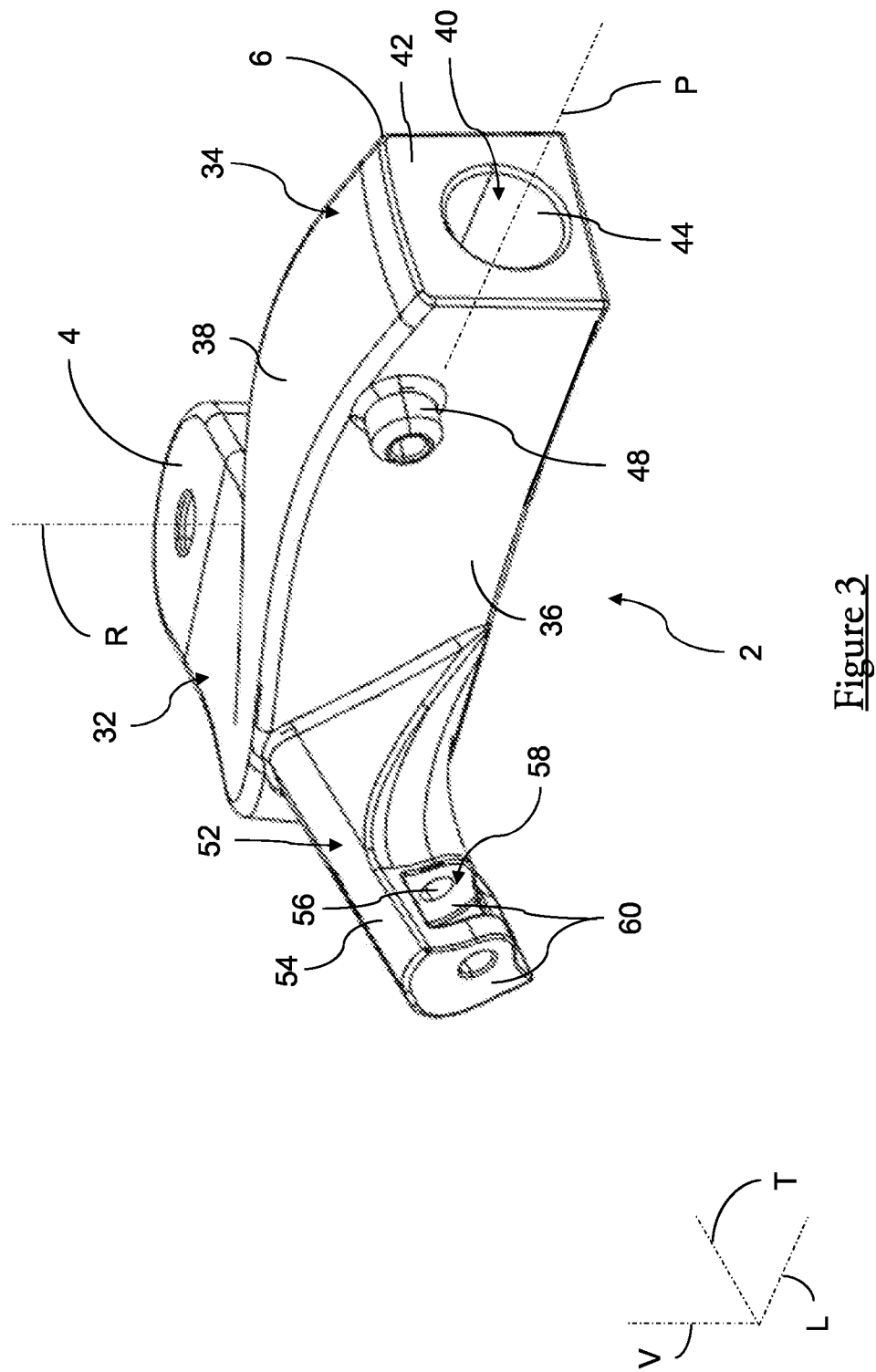
FIG. 3 is a perspective view of the drive attachment of the wiper system according to FIG. 2.

According to the FIG. 3, the drive attachment 2 generally takes an angle shape and comprises a first part 32 and a second part 34, the first part 32 being terminated by the first end 4 of the drive attachment and the second part 34 being terminated by the second end 6 of the drive attachment, each part extending along an axis secant to the main axis of elongation of the other part.

Viewed in section, the drive attachment 2 is "U-shaped", according to a cut view made in a plane in which the transversal axis T and the vertical axis V lie. The drive attachment 2 comprises two lateral sides 36 and an upper side 38 linking the two lateral sides 36, each side 36, 38 extending from the first end 4 of the drive attachment 2 to the second end 6 of the drive attachment 2. At least in the second part 34 of the drive attachment 2, each lateral side 36 extends in a plane parallel to the longitudinal and vertical axis L, V, whereas the upper side 38 extends in a plane parallel to the longitudinal and transversal axis L, T. The lateral and upper sides 36, 38 participate to delimit a cavity 40. The drive attachment 2 comprises also a front side 42 being located at the second end 6 of drive attachment 2 by joining the lateral sides 36 and the upper side 38. The drive attachment 2 presents a bore 44 at the second end 6 located at the front side 42 of the drive attachment 2. The bore 44 is a through-hole of the front side 42 linking the cavity 40 to the exterior of the drive attachment 2. The bore 44 extends along the longitudinal axis L and is configured to cooperate with a connecting body 46 of the wiper system 1, the connecting body 46 being described later in the description.

At its first end 4, the drive attachment 2 comprises a hole configured to host a shaft of the electrical motor of the vehicle. The hole extends along the vertical axis V through of the upper side 38 and inside the cavity 40. Here, the hole takes a circular shape.

Moreover, the drive attachment 2 comprises an outgrowth 48 which emerges from one of the lateral sides 36 along the traversal axis T to the outside of the drive attachment 2. The outgrowth 48 is more particularly located proximate to the second end 6 and takes a shape like a circular shaft. The outgrowth 48 is configured to cooperate with a mechanical link 50, which is described later in the description.

According to the invention and as shown in FIG. 3, the wiper system 1 comprises a holding device 52 emerging from one of the lateral sides 36 along the traversal axis T to the outside of the drive attachment 2. The holding device 52 and the outgrowth 48 emerge from the same lateral side 36 of the drive attachment 2. The holding device 52 is formed by a support wall 54 which comprises a cavity 56 inside the holding device 52.

The holding device 52 is configured to be linked to one longitudinal end of the second arm 22. For that, the cavity 56 is delimited by an opening 58, this opening 58 facing the head 24 carried both arms 20, 22. The cavity 56 is delimited on the one hand by the support wall 54 and on the other hand by two panels 60 each extending in a plane parallel to the longitudinal and the vertical axis L, V, these panels being internal faces of the support wall 54. Each panel 60 comprises a hole, these two holes being aligned along the transversal axis T.

Furthermore, the holding device 52 presents a flared profile as it moves away from the drive attachment 2. In other words, a height of the holding device 52 measured along the vertical axis V at the drive attachment 2 is larger than a height of the holding device 52 measured along the vertical axis V at the opening 58.

Figure 4:
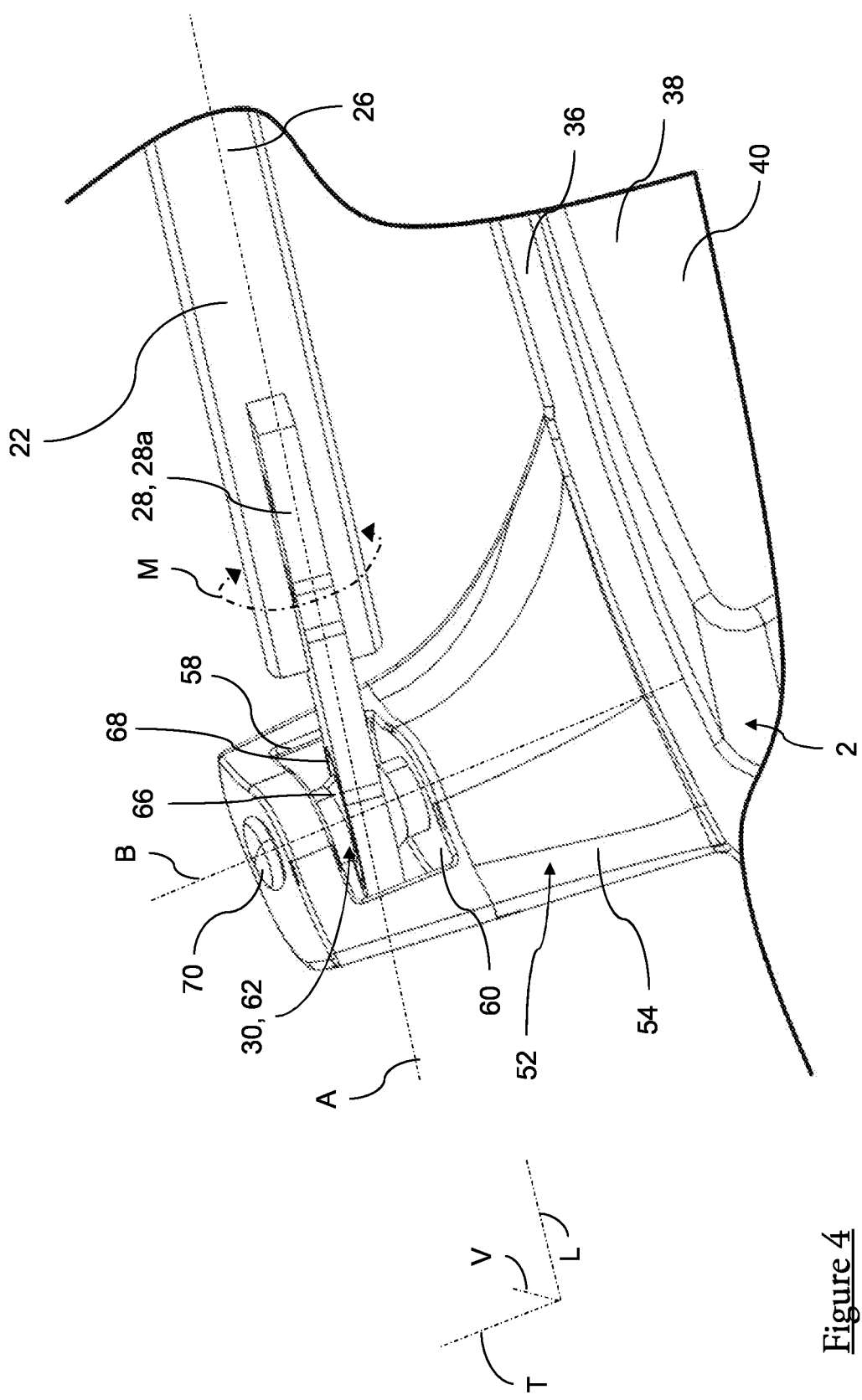
FIG. 4 is a detailed view of the holding device of the wiper system according to FIG. 3.

According to the FIG. 4, the rotational device 30 is located at the first extension 28a of the second arm 22 connected to the drive attachment 2. This first extension 28a of the second arm 22 is connected to the holding device 52. More particularly, the first extension 28a of the second arm 22 is located into the opening 58 of the holding device 52.

A rotational device 30 is dedicated to manage the rotation of the second arm around its first axis A, corresponding to the longitudinal axis of the second arm.

The wiper system 1 may comprise an articulation linking the second arm 22 to the holding device 52. The articulation, irrespective its location on the first longitudinal end of the arm or on the second longitudinal end, is dedicated to manage a rotation of the second arm versus the other to which it is attached around an axis which is perpendicular, or at least secant, to the first axis A of the second arm 22.

Figure 5:
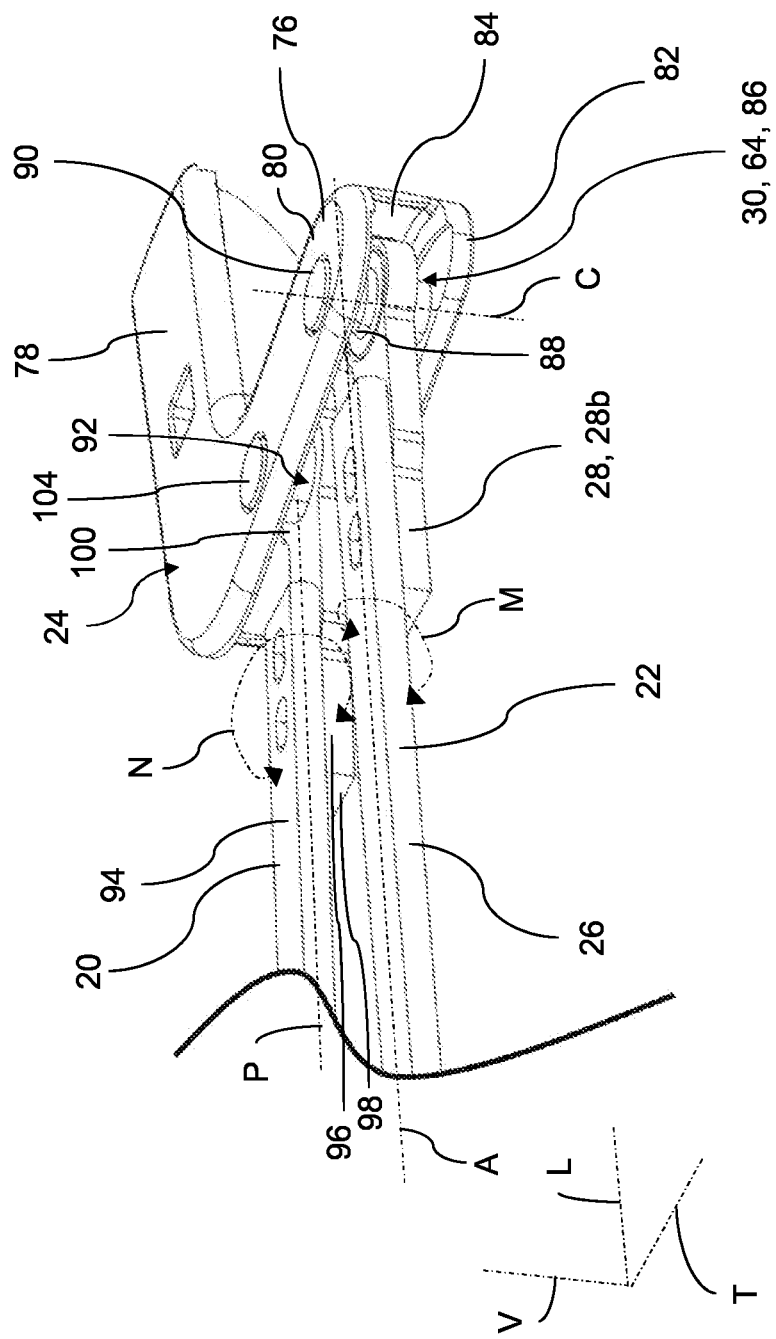
FIG. 5 is a perspective representation of a head of the wiper system according to FIG. 2.

As shown in FIG. 5, the second arm 22 comprises another articulation located at the second extension 28b in connection with the head 24 of the wiper system 1. In the following description, the articulation located near the holding device 52 is called "first articulation 62" and the articulation near the head 24 is called "second articulation 64".

As shown in FIG. 4, the rotational device 30 and the first articulation 62 take the form of a first ball joint 66 located at the end of the first extension 28a of the second arm 22 and connecting the latter to the holding device 52. The first ball joint 66 allows the motion M of the second arm 22 around the first axis A and around a second axis B which is parallel to the transversal axis T.

The second arm 22 comprises a first ball housing 68 located at the end of the first extension 28a in connection with the holding device 52 in which the first ball joint 66 is housed. The first ball housing 68 is composed by at least a spherical part in which the first ball joint 66 can rotate. For that, the first ball housing 68 presents an internal spherical side configured to house the first ball joint 66 and to allow a rotation of the first ball joint 66 into the spherical part and the motion of the second arm 22 around at least the first axis A, and potentially around the second axis B.

The first ball joint 66 takes the shape of a spherical ball with a through hole. The first ball joint 66 has two planar sides parallel each other's. The through hole is a circular hole configured to cooperate with a transversal shaft 70 of the wiper system 1 which is installed through the through hole of the first ball joint 66.

This transversal shaft 70 mentioned above extends along the transversal axis T and is installed in the two holes of the panels 60 of the holding device 52. The transversal shaft 70 cooperates with the first ball joint 66 to allow the motion of the second arm 22 around the first axis and around the second axis A, B. Moreover, the transversal shaft 70 comprises at least a blocking device at one of its ends to finalize its position inside the holding device 52.

As shown in FIG. 5, the rotational device may be located at the second extension 28b of the second arm 22, that is to say at the end located near the head 24. As an alternative, the wiper system 1 may comprise the rotational device 30 located near the holding device 52, as described above.

The head 24 comprises a first connection part 76 which is configured to connect the head 24 to the arms 20, 22 and a second connection part 78 which is configured to connect a wiper blade 18 to the head 24. The first connection part 76 extends mainly along the transversal axis T whereas the second connection part 78 extends mainly along the longitudinal axis L. At least the second connection part 78 of the head 24 takes the shape of a "U-shape" section according to a cut view made in a plane parallel to the longitudinal and the vertical axis L, V. The second connection part 78 comprises an upper wall 80 and a lower wall 82, both extending in a plane perpendicular to the vertical axis V, and a front wall 84 extending between the upper and lower walls 80, 82 in a plane perpendicular to the longitudinal axis L. The upper, lower and front walls 84 80, 82, 84 participate to delimit a housing that receives the ends of the first and the second arm 22.

Moreover, the upper wall 80 and the lower wall 82 each comprise at least two holes, the holes of the upper and the lower walls aligning two by two along the vertical axis. The pairs of holes are configured to house a shaft each.

According to the invention and as shown in FIG. 5, the rotational device 30 and the second articulation 64 are formed by second ball joint 86 located at the second extension 28b of the second arm 22, such a second joint ball 86 connecting said second arm 22 to the head 24. The second ball joint 86 allows at least a motion of the second arm 22 around the first axis A and around a third axis C which is parallel to the vertical axis V.

The second arm 22 comprises a second ball housing 88 in which the second ball joint 86 is housed and located at least at the second extension 28b in connection with the head 24. The second ball housing 88 is composed of at least a spherical part in which the second ball joint 86 can rotate. For that, the second ball housing 88 presents an internal spherical element configured to house the second ball joint 86 and to allow a rotation of the second ball joint 86 into the spherical part and to allow the motion M of the second arm 22 around the first axis A.

The second ball joint 86 takes the shape of a spherical ball with a through hole. The second ball joint 86 has two planar sides parallel each other's. The through hole is opening on both planar sides of the second ball joint 86. The through hole is a circular hole configured to cooperate with a vertical shaft 90 of the wiper system 1 which is installed through the through hole of the second ball joint 86.

This vertical shaft 90 mentioned above extends along the vertical axis V and is installed in one of the two pairs of holes of the upper and lower walls 80, 82 of the head 24. The vertical shaft 90 cooperates with the second ball joint 86 to allow the motion of the second arm 22 around the third axis C and around the first axis A. Moreover, the vertical shaft 90 comprises at least a blocking device at one of its ends to fix its position into the head 24.

It is understood with the above description that the first ball joint 66 allows the motion of the second arm 22 around the first and the second axis A, B, whereas the second ball joint 86 allows the motion of the second arm 22 around the first and the third axis A, C.

It will also be understood that, in certain alternative embodiments not illustrated here, it may be desirable to instead employ a series of universal joints in the second arm 22, or other type of mechanical linkage, so as to permit motion of the second arm 22 around the first and second axis A, B and around the first and third axis A, C, as above.

Now, we are going to describe the structure of the first arm 20 and its connection with the drive attachment 2 on one side, and with the head 24 on the other side, in relation to the FIGS. 5 to 10.

According to the FIG. 5, the wiper system 1 comprises a rotational connection 92 allowing a motion N of the first arm 20 around the vertical axis V. For that, the first arm 20 comprises, like the second arm 22, a main rod 94 and at least a prolongation rod 96 which extends the main rod 94 along the longitudinal axis L, in direction to the head 24. The prolongation rod 96 is connected at a first longitudinal end 98 of the main rod 94 and at a second longitudinal end 100 to the head 24. At its second longitudinal end 100, the prolongation rod 96 comprises a through hole with which the first arm 20 cooperates with the rotational connection 92.

The rotational connection 92 comprises a pivot shaft 104 that extends along the vertical axis V. The pivot shaft 104 is installed through one of the pairs of the holes of the upper and lower walls 80, 82 of the head 24 and through the through hole of the prolongation rod 96.

According to the invention, the wiper system 1 comprises a connecting body 46 that is linking the first arm 20 to the drive attachment 2, the wiper system 1 also comprising a pivot link P between the connecting body 46 and the drive attachment 2 and a rotational link D between the connecting body 46 and the first arm 20.

Figure 6:
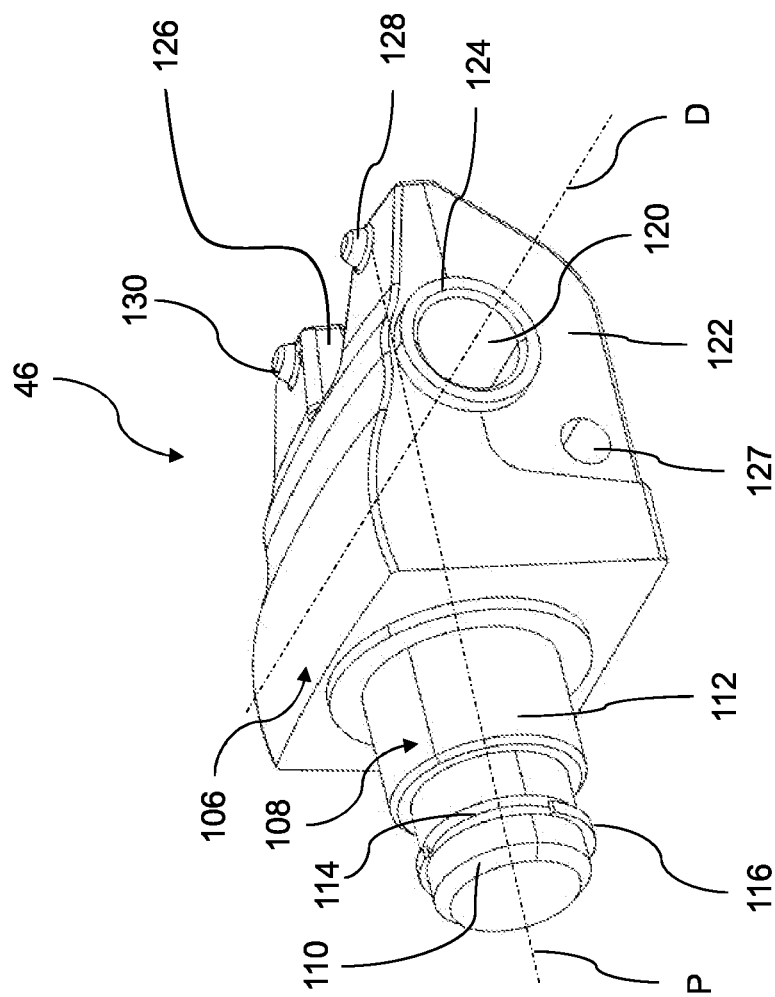
FIG. 6 is a perspective representation of a connective body of the wiper system according to FIG. 2.
Figure 6:
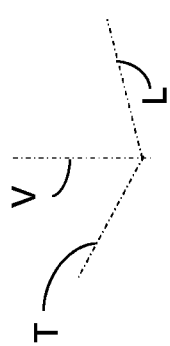
Figure 7:
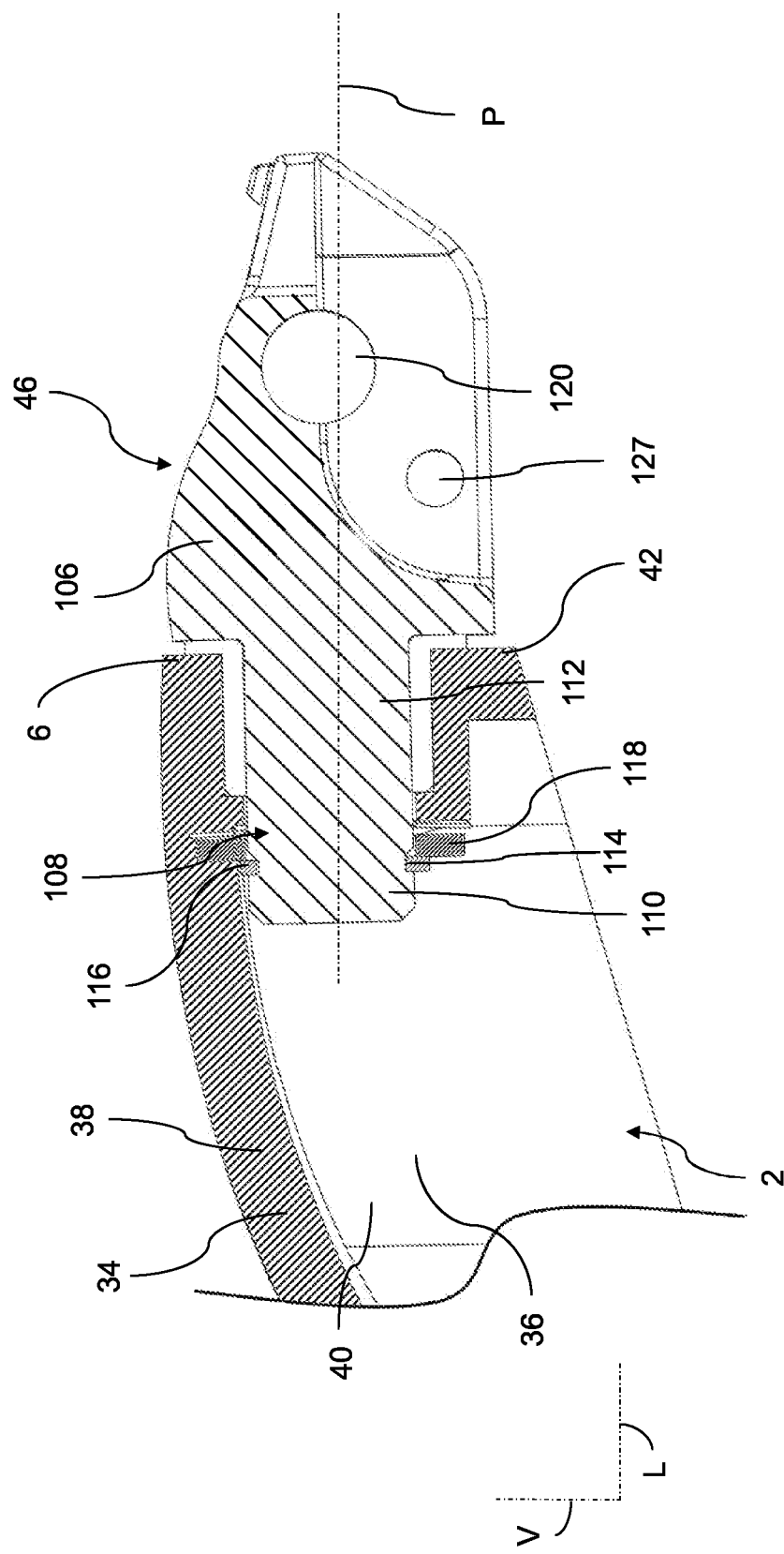
FIG. 7 is a longitudinal cut of the drive attachment according to FIG. 3 and the connective body according to FIG. 6.

As shown in FIG. 6, the connecting body 46 is configured to be linked to one hand at the first arm 20 and at another hand to the drive attachment 2. The connection between the connecting body 46 and the first arm 20 forms the rotational link D around which the first arm 20 and the wiper blade 18 can rotate. This rotational link D extends along a first direction essentially parallel to the transversal axis T of the marker L, V, T. The connection between the connecting body 46 and the drive attachment 2 forms the pivot link P around which the connecting body 46 and the first arm can rotate with respect to each other. This pivot link P extends along a second direction essentially parallel to the longitudinal axis L of the marker L, V, T.

The connecting body 46 comprises a main body 106 and at least a pivot element 108 extending from the main body 106 to the exterior of the connecting body 46, along the longitudinal axis L. The pivot element 108 is a pin-like cylinder presenting different sections among which are an extremity section 110 and at least a base section 112 located between the extremity section 110 and the main body 106. The extremity section 110 differs from the base section 112 with a different diameter, and more particularly, the extremity section 110 has a smaller diameter than the diameter of base section 112.

The extremity section 110 includes a notch 114 located circularly around the pivot element 108. The notch 114 is made circularly all around and inside the pivot element 108. As a consequence, the notch 114 has a smaller diameter than the diameter of the extremity section 110.

The connecting body 46 comprises an axial blocking device which is here a clip 116 configured to cooperate with the notch 114 of the pivot element 108. The clip 116 is a circular rod which is elastically deformable. More precisely, the clip 116 deforms its initial structure to be assembled or disassembled on the pivot element 108 in the notch 114 and returns to its initial structure after being deformed. The clip 116 is used to hold the connecting body 46 once the pivot element 108 is housed in the bore 44 of the drive attachment 2, as best seen on FIG. 7. For that, the clip 116 has an intern diameter slightly larger than the diameter of the notch 114 to form a cooperation with it when the clip 116 is assembled on the notch 114. Moreover, the extern diameter of the clip 116 is larger than the diameter of the extremity section 110 and the diameter of the bore 44 of the drive attachment 2.

The pivot element 108 is housed into the bore 44 of the drive attachment 2, the extremity section 110 being in the cavity 40 of the drive attachment 2. For that, the diameter of the extremity section 110 is smaller than the diameter of the bore 44 to allow the cooperation between the pivot element 108 and the bore 44. The clip 116 is assembled on the notch 114 once the extremity section 110 and more particularly the notch 114 is into the cavity 40 of the drive attachment 2.

The drive attachment 2 may comprise a washer 118 disposed in the cavity 40 at the front side 42 and having a hole into its center, the hole of the washer 118 having the same diameter than the diameter of the bore 44. The clip 116 is configured to have an external diameter larger than the diameter of the hole of the washer 118. Once the clip 116 assembled into the notch 114 of the extremity section 110 of the pivot element 108, the clip 116 retains the pivot element 108 into the bore 44 by abutting against the washer 118, the cooperation between the clip 116 and the washer 118 holds the connecting body 46 on the drive attachment 2 in position.

Moreover, the bore 44 of the drive attachment 2 takes the shape of a shoulder ring cooperating with the base section 112 of the pivot element 108. The diameter of the shoulder ring is slightly smaller than the diameter of the base section 112 of the pivot element 108, the base section 112 can be in the shoulder ring once the pivot element 108 is housed in the drive attachment 2. The base section 112 of the pivot element 108 helps the pivot element 108 of the connecting body 46 to slide in the bore 44 of the drive attachment 2 when the connecting body 46 rotates around the second direction that defines the pivot link P.

The pivot element 108 and the bore 44 cooperate to form the pivot link P that rotates around the second direction. Thus, the pivot element 108 and the connecting body 46 can respectively be moved around this pivot link P in the bore 44 and the drive attachment 2.

The connecting body 46 comprises a channel 120 that extends into the main body 106, parallel to the transversal axis T. The channel 120 is circular, like a hollow cylinder, and runs through the main body 106. The channel 120 has a first opening located on a first lateral side 122 of the main body 106, a second opening of the channel 120 located on a second lateral side of the main body 106. The first and the second lateral sides 122 of the main body 106 are perpendicular to the transversal axis T.

The channel 120 comprises a crown 124 at least around the first opening as shown in the FIG. 6, or preferably around each opening. The crown 124 is like a hoop flanking the first opening and emerged from the main body 106 to the exterior of the main body 106 along the transversal axis T.

As shown in the FIG. 6, the main body 106 comprises at least an orifice 127 that runs through the main body 106 from the first lateral side 122 to the second lateral side. The orifice 127 is a hollow cylinder. The diameter of the orifice 127 is smaller than the diameter of the channel 120, the orifice 127 and the channel 120 are separated and independent of each other.

The main body 106 comprises a groove 126 extending along the longitudinal axis L, the groove 126 being opposite to the pivot element 108 with respect of the channel 120, as it can be seen in the FIG. 6. The groove 126 delimits a first tab 128 next to the first lateral side 122 of the main body 106 and a second tab 130 next to the second lateral side of the main body 106. Each tab 128, 130 extends from the main body 106 along the longitudinal axis L, and away from the pivot element 108 with respect to the channel 120. Moreover, each tab 128, 130 comprises a pin extending from the tab to the exterior, opposite to the orifice 127 with respect of the channel 120, this opposition being realized along the vertical axis V.

The channel 120 and the orifice 127 of the connecting body 46 are configured to cooperate with the first arm 20, the connecting body 46 liaising between the first arm 20 and the drive attachment 2.

Figure 8:
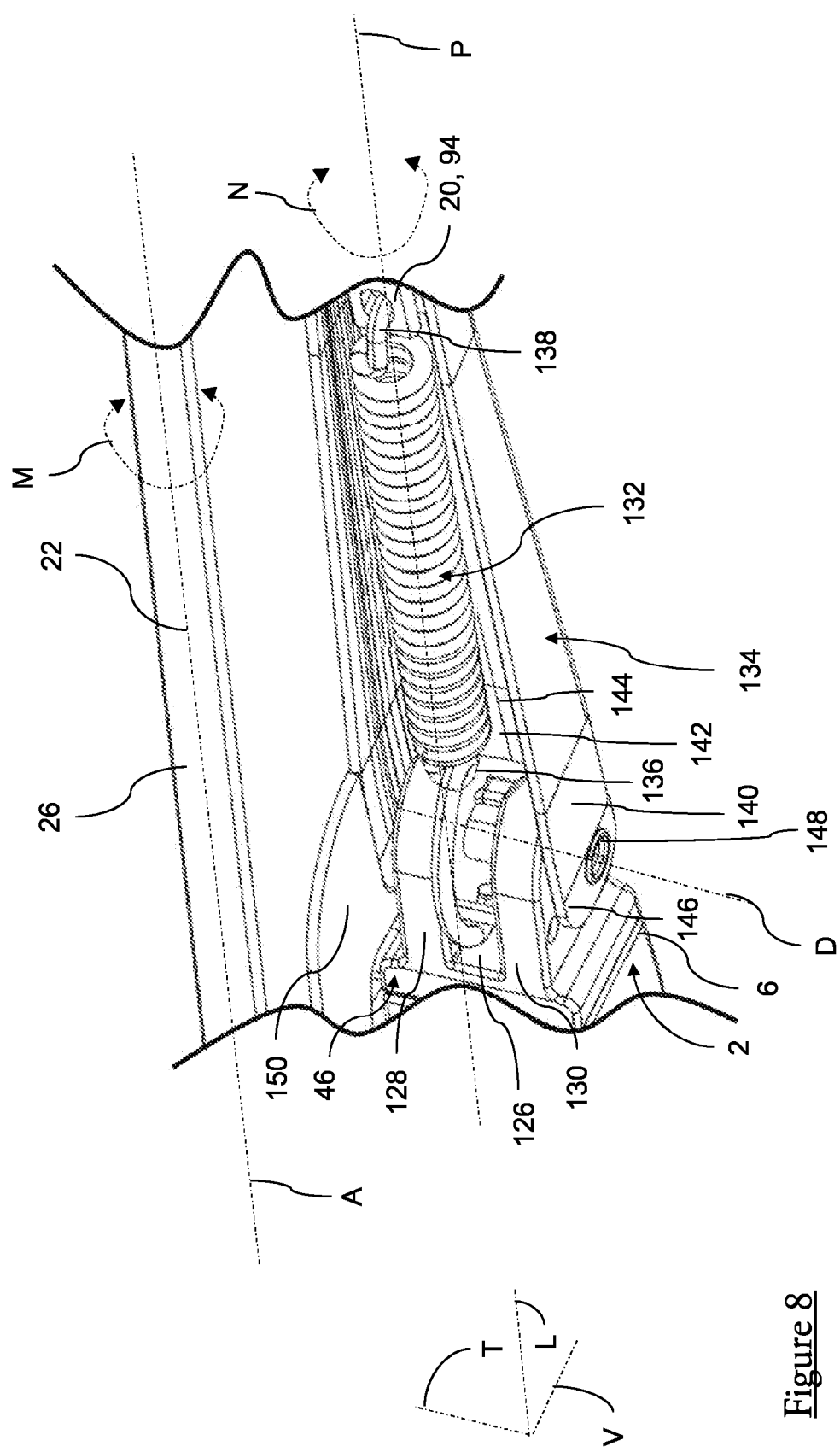
FIG. 8 is a detailed representation of the wiper system according to FIG. 2.

As shown in the FIG. 8, the first arm 20 comprises, in addition to the main rod 94, at least a spring element 132 and a covering hood 134.

The spring element 132 extends between the main rod 94 and the connecting body 46 along the longitudinal axis L, each end of the spring element 132 being connected to the connecting body 46 and to the main rod 94. As best seen in FIG. 8, the spring element 132 comprises a first hook 136 connected to the connecting body 46 and a second hook 138 connected to the main rod 94. More particularly, the first hook 136 engages on a shaft partially housed in the orifice 127, the second hook 138 being attached to one end of the main rod 94.

The covering hood 134 generally takes the shape of a "U-shape" section according to a cut view made in a plane in which the transversal axis T and the vertical axis V lie, with two lateral walls 140 and a covering wall 142 linking the two lateral walls 140, each lateral and covering wall 140, 142 extending from a first longitudinal extremity to a second longitudinal extremity of the covering hood 134. Each lateral wall 140 extends in a plane parallel to longitudinal and vertical axis L, V, whereas the covering wall 142 extends in a plane parallel to longitudinal and transversal axis L, T.

Each lateral and covering wall 140, 142 of the covering hood 134 participates to delimit a chamber 144 wherein the spring element 132 is housed once the wiper system 1 is assembled, as shown in the FIG. 8.

Each lateral wall 140 of the covering hood 134 has a longitudinal extension 146 extending from the lateral wall 140 to the exterior of the covering hood 134 along the longitudinal axis L. Each longitudinal extension 146 comprises a circular opening 148 which diameter is slightly bigger than the external diameter of the crown 124 of the channel 120 of the connecting body 46.

The longitudinal extensions 146 of the covering hood 134 partially cover the lateral sides 122 of the connecting body 46. Once the wiper system 1 is assembled, the connecting body 46 is interposed between each longitudinal extension 146 of the covering hood 134, the crowns 124 of the channels' openings being housed in the circular openings 148 of the longitudinal extensions 146. The cooperation between the crowns 124 of the channel 120 and the circular openings 148 is an example of the rotational link D between the first arm 20 and the connecting body 46, said rotational link D offering the possibility to rotate the first arm 20 around the rotational link D.

Moreover, at least one of the lateral walls 140 comprises an lower extension 150 extending along the vertical axis V and along the longitudinal axis L from the lateral wall 140 to the exterior of the covering hood 134 and opposite to the covering wall 142 with respect of the circular opening 148. The lower extension 150 of the lateral wall 140 is near to the first lateral side 122 of the connecting body 46. The lower extension 150 is an integrated part with the covering hood 134, but an lower extension 150 can be a separate element and be assembled at the covering hood 134 during a supplementary operation, without going beyond the scope of the invention.

Figure 9:
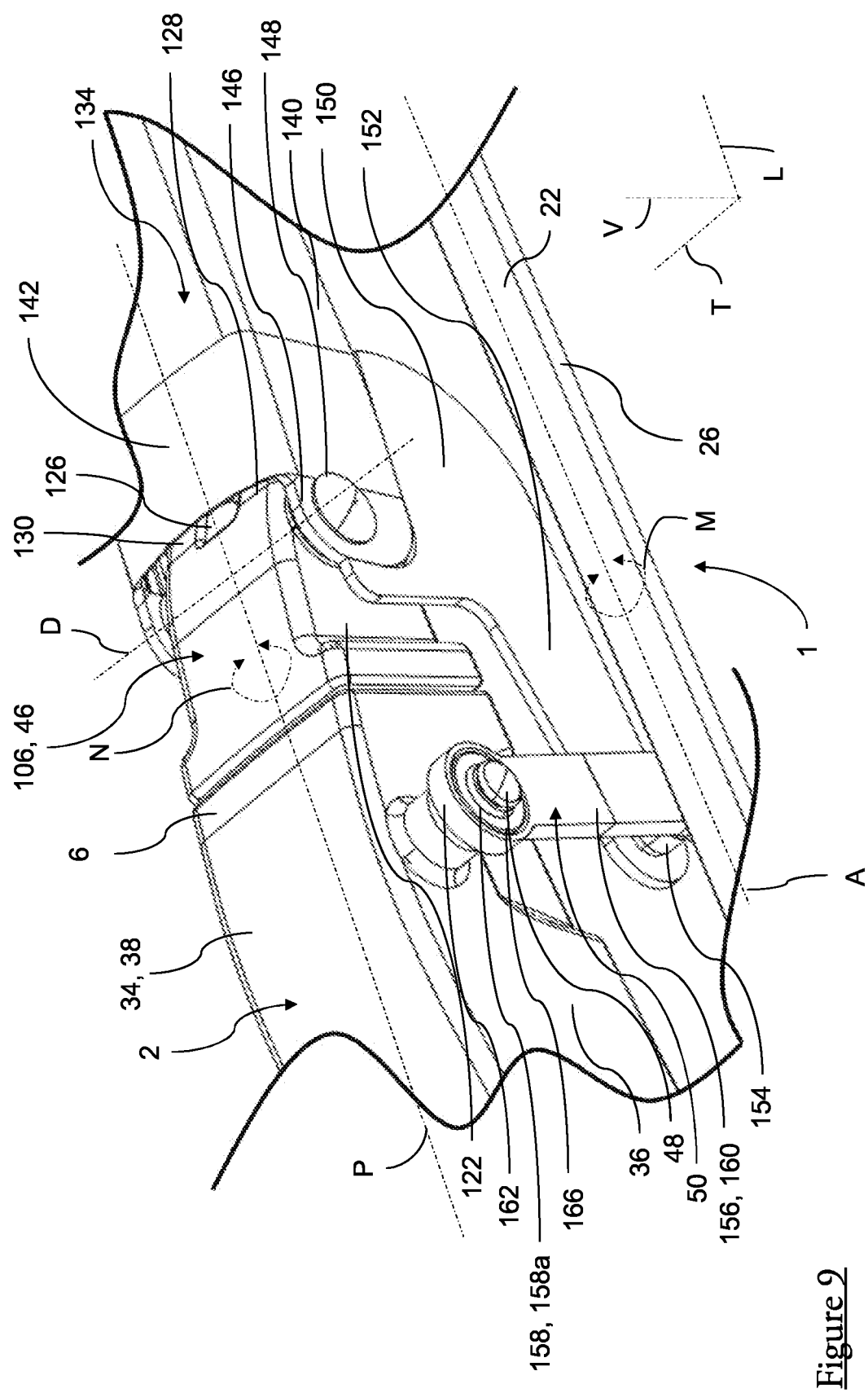
FIG. 9 is a perspective representation of a first example of a mechanical link of the wiper system according to the invention.

As shown in FIGS. 2 and 9, in one embodiment of the invention, the lower extension 150 comprises a secondary extension 152 which extends along the longitudinal axis L from the lower extension 150 to the drive attachment 2 and opposite to the first arm 20.

The lower extension 150 has an outgrowth 154 taking the shape of a generally cylindrical pin protruding from one of the lateral walls 140 to the exterior of the covering hood 134, parallel to the transversal axis T. The outgrowth 154 of the covering hood 134 is located on the secondary extension 152 and aligned with the outgrowth 48 of the drive attachment 2 along the vertical axis V.

In the following description and to simplify the understanding of the invention, the terms "first" and "second" are used to differentiate the outgrowth 48 of the drive attachment 2 from the outgrowth 154 of the covering hood 134, such as the first outgrowth 48 refers to the outgrowth 48 of the drive attachment 2, and the second outgrowth 154 refers to the outgrowth 154 of the covering hood 134.

According to an aspect of the invention, the wiper system 1 comprises a mechanical link 50 between the drive attachment 2 and the first arm 20, this mechanical link 50 enforcing the rotation of the connecting body 46, the first arm around the pivot link P, in both senses around the pivot link P. This mechanical link 50 also enforces the rotation of the second arm around its longitudinal axis. As an example, the mechanical link 50 connects the drive attachment 2 to the covering hood 134.

Figure 10:
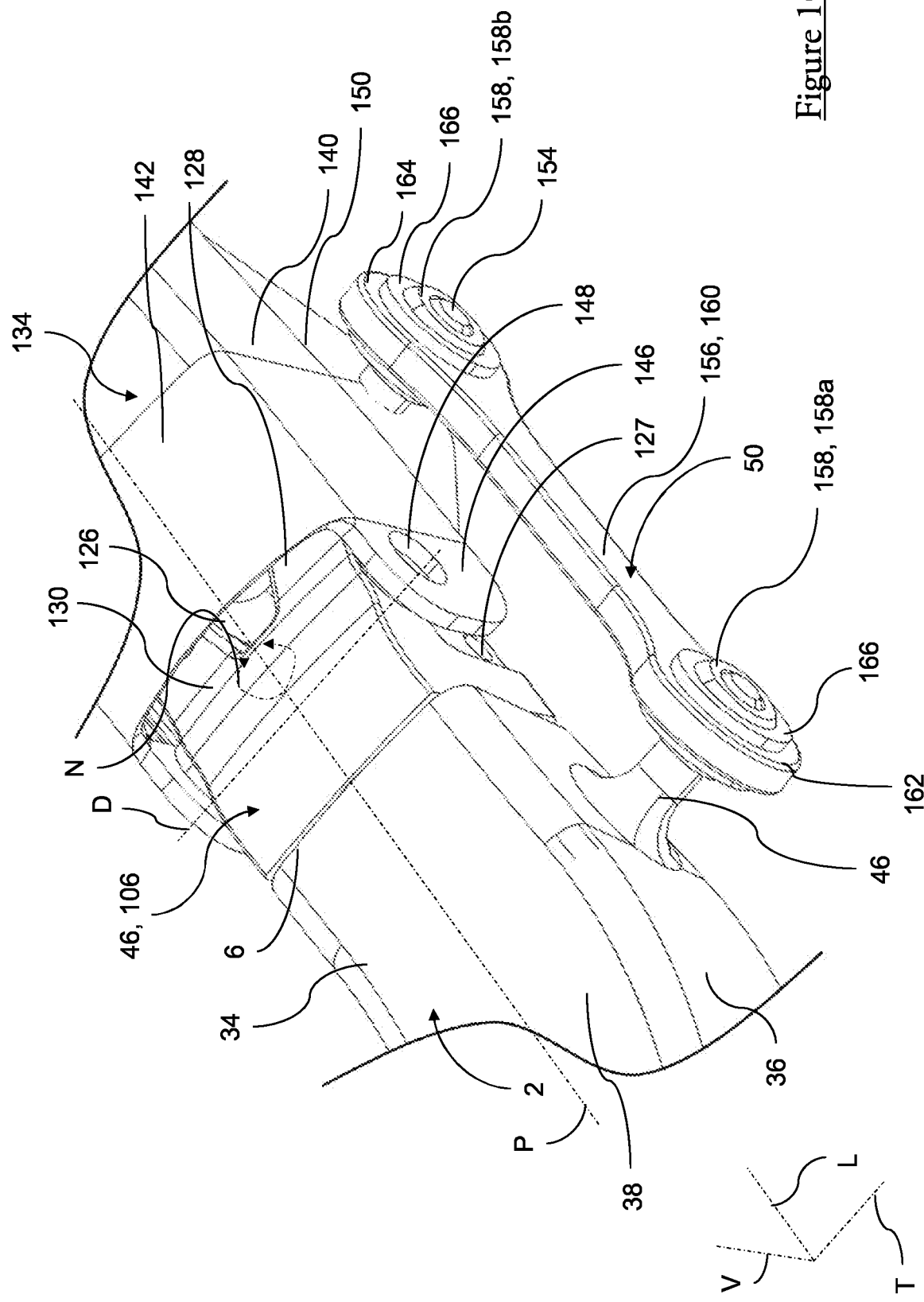
FIG. 10 is a perspective representation of a second example of a mechanical link of the wiper system according to the invention.

In the preferred embodiment, the mechanical link 50 comprises a lever piece 156 and at least a ball articulation 158 disposed at one connection end of the lever piece 156, as shown in FIG. 9 or 10. According to the represented examples, the lever piece 156 has a central part 160 extending rectilinearly between a first connection end 162 and a second connection end 164, each connection end 162, 164 of the lever piece 156 comprising a ball articulation 158.

More particularly, the lever piece 156 extends rectilinearly between the first and the second connection ends 162, 164. The lever piece 156 comprises an articulation housing 166 at each connection end 162, 164 in which the ball articulation 158 is housed. Each articulation housing 166 is composed by at least a spherical part in which the ball articulation 158 can rotate. For that, each spherical part of the lever piece 156 presents an internal spherical side configured to house the ball articulation 158 and to allow a rotation of the ball articulation 158 into the spherical part.

As shown in FIG. 9 or 10, a first ball articulation 158a is housed in a first articulation housing at the first connection end 162 and a second ball articulation 158b is housed in a second articulation housing as the second connection end 164.

The ball articulations 158 take the same shape as the ball joint located at each end of the second arm 22. So, the ball articulations 158 take the shape of a spherical ball with a through hole. The ball articulation 158 has two planar sides parallel to each other's. The through hole is opening on both planar sides of the ball articulation 158. The through hole is a circular hole configured to cooperate with the first or the second outgrowths 48, 154.

As represented in the FIG. 9 or 10, the lever piece 156 cooperates with the covering hood 134 and the drive attachment 2 by housing the first outgrowth 48 in the first ball articulation 158a and housing the second outgrowth 154 in the second ball articulation 158b. The lever piece 156 is held in position on the wiper system 1 by the tight guidance of each outgrowth 48, 154 in its respective ball articulation 158.

As shown at least in the FIG. 9, the lever piece 156 extends mainly along the vertical axis V.

In another embodiment of the invention shown on FIG. 10, the lower extension 150 does not comprise the secondary extension 152, so the both outgrowths 48, 154 are aligned slightly along the longitudinal axis L, the lever piece 156 extending slightly along the longitudinal axis L, too. The second arm 22 is not represented on the FIG. 10 to have a better visibility of the lever piece 156, but it is understood that, as pantographic wiper system, such a second arm is present.

Figure 11:
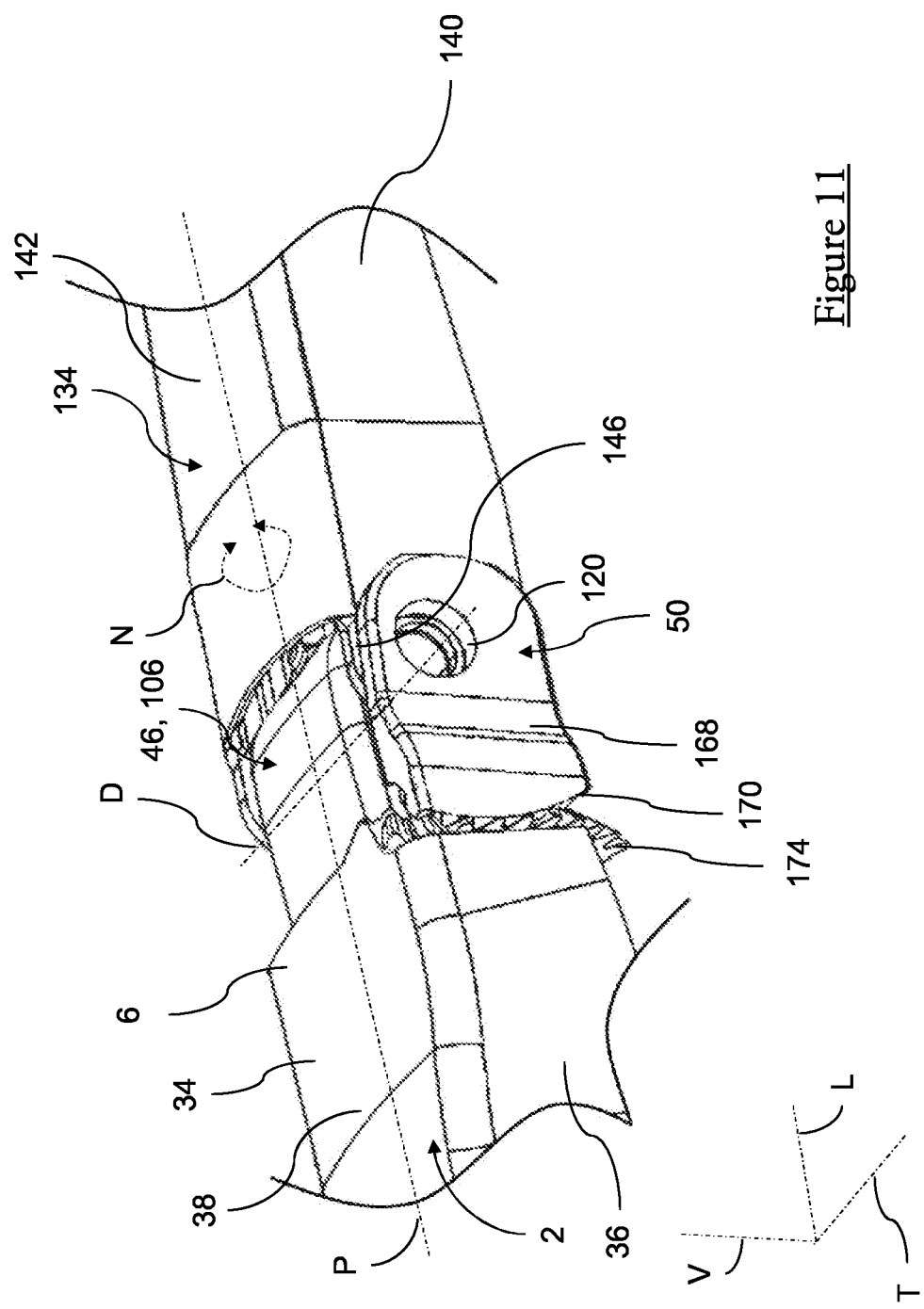
FIG. 11 is a perspective representation of a third example of a mechanical link of the wiper system according to the invention.

In another embodiment of the invention shown on FIG. 11, the mechanical link 50 comprises a lever body 168 with a gear 170 meshing with a toothed sector 174 provided on the drive attachment 2, the toothed sector 174 and the gear 170 presenting a curve profile. Indeed, the lever body 168 comprising on the one hand a circular orifice 127 cooperating with the connecting body 46 and the first arm 20, and on the other hand the gear 170 cooperating with the toothed sector 174 of the drive attachment 2. We can be noted that the second arm 22 is also not represented on FIG. 11 to have a better visibility of the mechanical link 50.

We will now describe the cooperation between the mechanical link 50 and the rest of components of the wiper system 1 with reference to FIGS. 9 to 10.

As shown in FIGS. 9 and 10, the wiper system 1 is represented in a first position corresponding to the moment when the scraper blade of the wiper blade wipes the first portion of the panoramic window. In this first position, the lever piece 156 extends parallel to the vertical axis T for the preferred embodiment and to the longitudinal axis L in the alternative embodiment. Moreover, the covering wall 142 of the covering hood 134 extends in a plane parallel to a plane in which the transversal axis T and the longitudinal axis L lie, this plane being also parallel to a plane in which the upper side 38 of the drive attachment 2 extends. At the same time, the lateral walls 140 of the covering hood 134 extend in plans parallel to the plans in which the lateral sides 36 of the drive attachment 2 extend.

The spring element 132 maintains the scraper blade against the panoramic window to assure the wiping of the said panoramic window. When the wiper system 1 moves to the second portion 12 of the panoramic window, a traction force of the spring element 132 holds the scraper blade against this second portion 12 of the panoramic window, the wiper system 1 gradually changing to a second position. During this move, the connecting body 46 and the first arm 20 rotate around the pivot link P, and the second arm 22 rotates at least around the first axis A.

In this second position, the wiper system 1 is configured to wipe the second portion 12 of the panoramic window. Thus, the covering wall 142 of the covering hood 134 extends in a plane that is secant with the plane wherein the upper side 38 of the drive attachment 2 extends. At the same time, the lateral walls 140 of the covering hood 134 extend in plans parallel to each other's and that intersects the plans in which the lateral sides 36 of the drive attachment 2 extend.

The spring element 132 holds the scraper blade against the second portion 12 of the panoramic window, the lever piece 156 turning the first arm 20 and the second arm 22 in order to align the scraper blade of the wiper blade 18 onto the second portion 12 of the window.

Whatever the embodiment, the lever piece 156 maintains an equidistance between the first outgrowth 48 and the second outgrowth 154, the ball articulations 158 allowing the rotation of the lever piece 156 around the outgrowths 48, 154. Moreover, the second arm 22 also maintains an equidistance between the holding device 52 and the head 24, the rotational devices 30, 74 and the articulations 62, 64 allowing the motion of the second arm 22 around the first, the second and the third axis A, B, C. The rotations of the lever piece 156 around that outgrowths 48, 154, the motion N of the second arm 22 and the traction force of the spring element 132 allow a perfect transition of the scraper blade from the first portion 10 to the second portion 12 of the panoramic window, as well as a perfect positioning of the scraper blade onto the first portion 10 and onto the second portion 12 of the panoramic window, respecting an angle of the wiper blade 18 that allow the scraper blade to move from in-wipe movement to out-wipe movement. This specific angle formed by the line crossing the contact point of the scraper blade in contact with the windshield 8 and the hinge of such scraper blade. When the wiper system 1 returns to wipe the first portion of the panoramic window, the wiper system 1 gradually moves back from the second position to the first position.

We can understand from the above description that the second arm 22 participates to maintain a great position of the scraper blade on the windshield 8 when the scraper blade wipes the first portion 10 and the second portion 12 of the windshield 8, as well as during the transition from this first portion to the second portion. The motion of the second arm 22 around the first axis A allows a gradual changing of positions of the wiper system 1 to optimize the holding of the wiper blade in each of the positions of the wiper system 1.

The invention shall not, however, be limited to the means and configurations described and illustrated herein and shall also extend to any equivalent means or configuration described and illustrated herein, and to any technical combination operating such means.

What is claimed is:

1. A wiper system of a pantographic form for cleaning a vehicle window, comprising a drive attachment, a first arm, a second arm and a head configured to hold a wiper blade, the first arm extending between the drive attachment and the head, the second arm extending between a holding device attached to the drive attachment and the head a connecting body that is linking the first arm to the drive attachment a pivot link between the connecting body and the drive attachment;

a mechanical link between the drive attachment and the first arm enforcing a rotation of the pivot link; and a rotational link between the connecting body and the first arm a rotational device configured to allow a motion around a first axis corresponding to a main axis of elongation of the second arm located between the head and the second arm or between the holding device and the second arm.

2. The wiper system according to claim 1, where the rotational device is located at least at one end of the second arm.

3. The wiper system according to claim 1, including an articulation linking the second arm to the holding device.

4. The wiper system according to claim 3, where the rotational device and the articulation are located at one end of the second arm and are formed by a ball joint.

5. The wiper system according to claim 4, where the articulation that is configured to link the second arm to the holding device is a first articulation, and a second articulation linking is configured to link the second arm to the head.

6. The wiper system according to claim 5, where the rotational device and the second articulation are located at one end of the second arm and are formed by a ball joint.

7. The wiper system according to claim 6, where the ball joint, which is located at one end of the second arm, is configured to allow a rotational motion of the second arm around a second axis that is perpendicular to the first axis.

8. The wiper system according to claim 7, where the first articulation is configured to allow the motion of the second arm around the first axis and around the second axis, the second articulation configured to allow a motion of the second arm around a third axis, which is perpendicular to the first axis and to the second axis.

9. The wiper system according to claim 1, characterized in that the rotational link has an axis that extends along a first direction, the pivot link having an axis that extends along a second direction, said first direction and said second direction being secant.

10. The wiper system according to claim 9, where the mechanical link includes a lever piece and at least a ball articulation disposed at one end of the lever piece.

11. The wiper system according to claim 10, where the drive attachment or the first arm includes at least an outgrowth on which the ball articulation is arranged.

12. The wiper system according to claim 9, where the mechanical link includes a lever body with a gear meshing with a toothed sector provided on the drive attachment, the toothed sector and the gear presenting a curve profile.

13. The wiper system according to claim 1, including a spring element attached to the connecting body and to the first arm.

14. A wiper system of a pantographic form for cleaning a vehicle window, comprising:

a drive attachment, a first arm, a second arm and a head configured to hold a wiper blade, the first arm extending between the drive attachment and the head, the second arm extending between a holding device attached to the drive attachment and the head;

a connecting body that is configured to link the first arm to the drive attachment;

a pivot link located between the connecting body and the drive attachment;

a rotational link located between the connecting body and the first arm;

a rotational device that is configured to allow a motion around a first axis corresponding to a main axis of elongation of the second arm located between the head and the second arm or between the holding device and the second arm; and a mechanical link cooperating with the connecting body, the mechanical link including a lever body with a gear meshing with a toothed sector provided on the drive attachment, the toothed sector and the gear presenting a curve profile.

* * * * *